United States Patent
Liu et al.

(10) Patent No.: US 12,548,588 B2
(45) Date of Patent: Feb. 10, 2026

(54) FAKE VOICE DETECTION METHOD BASED ON DUAL-TRACK DIFFERENTIAL MODELING

(71) Applicant: Inner Mongolia University, Hohhot (CN)

(72) Inventors: Rui Liu, Hohhot (CN); Jinhua Zhang, Hohhot (CN); Yifan Hu, Hohhot (CN); Haolin Zuo, Hohhot (CN); Yuxuan Ma, Hohhot (CN)

(73) Assignee: Inner Mongolia University, Hohhot (CN)

( * ) Notice: Subject to any disclaimer, the term of this patent is extended or adjusted under 35 U.S.C. 154(b) by 169 days.

(21) Appl. No.: 18/537,818

(22) Filed: Dec. 13, 2023

(65) Prior Publication Data
US 2025/0095669 A1    Mar. 20, 2025

(30) Foreign Application Priority Data
Sep. 20, 2023  (CN) .......................... 202311223079.X

(51) Int. Cl.
  *G10L 15/00*  (2013.01)
  *G10L 17/04*  (2013.01)
  *G10L 25/18*  (2013.01)
  *G10L 25/51*  (2013.01)

(52) U.S. Cl.
  CPC .............. *G10L 25/51* (2013.01); *G10L 17/04* (2013.01); *G10L 25/18* (2013.01)

(58) Field of Classification Search
  CPC .......... G10L 25/18; G10L 25/51; G10L 17/04
  USPC ......................................................... 704/231
  See application file for complete search history.

(56) References Cited

FOREIGN PATENT DOCUMENTS

CN            116543795 A  *  8/2023  ............. G10L 25/51

* cited by examiner

*Primary Examiner* — Md S Elahee
(74) *Attorney, Agent, or Firm* — Bayramoglu Law Offices LLC

(57) ABSTRACT

A fake voice detection method based on dual-track differential modeling includes: converting, by a pre-trained single/dual-track voice conversion model, a single-track audio into a stereo; extracting left and right-track Mel spectrogram features; performing texture enhancement on absolute values of differences between an original single-track Mel spectrogram feature and each of the left and right-track Mel spectrogram features; inputting texture enhancement results into left and right dual-branch feature extractors respectively to acquire a final attention map through feature extraction, processing and fusion; and inputting the final attention map into an attention pooling layer and a final binary classification layer to acquire a fake voice detection result. The fake voice detection method achieves fake voice detection by means of dual-track differential modeling, fine-grained texture enhancement, and multi-head attention feature fusion, improving the accuracy, transferability, and generalization of fake voice detection.

11 Claims, 1 Drawing Sheet

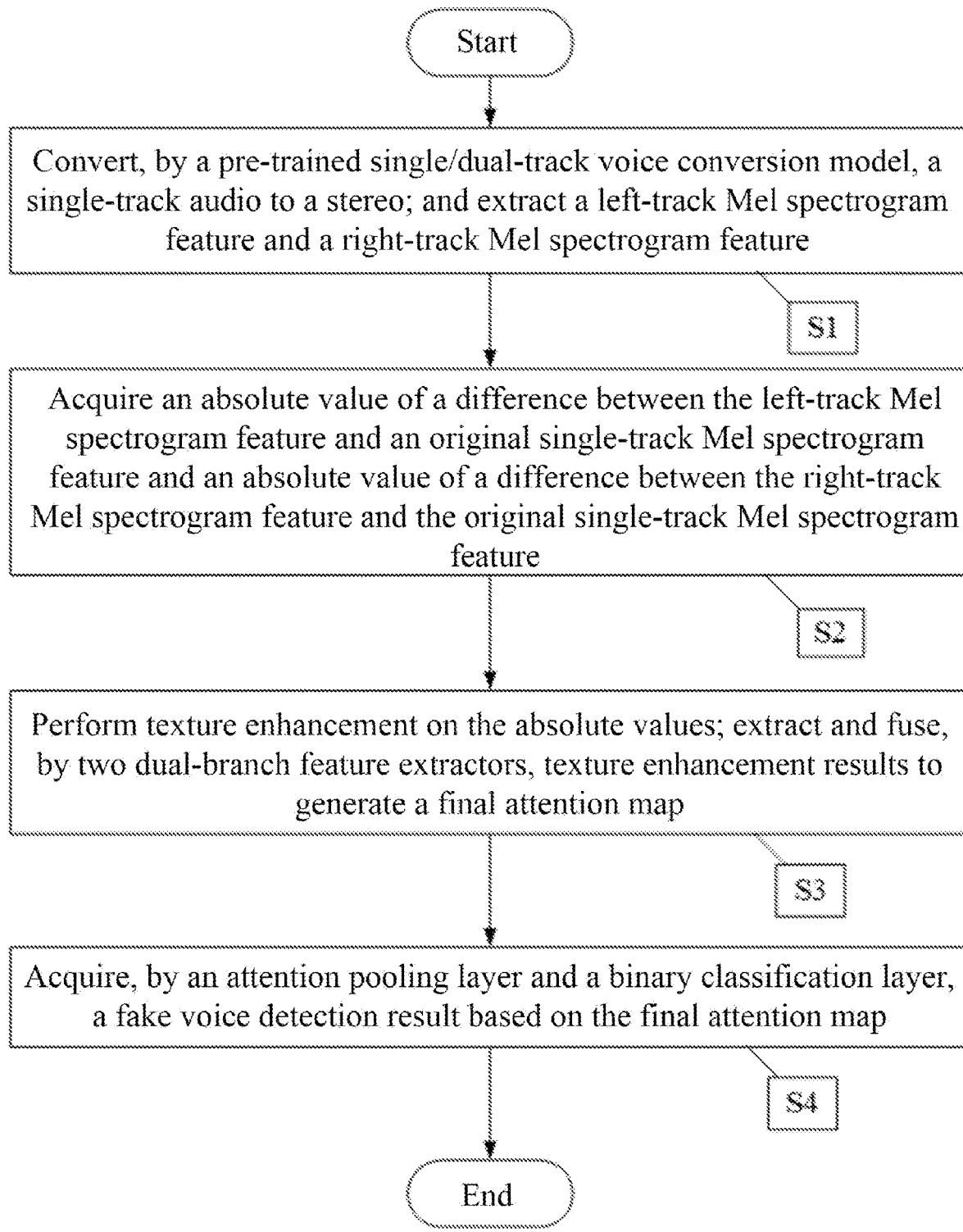

FAKE VOICE DETECTION METHOD BASED ON DUAL-TRACK DIFFERENTIAL MODELING

CROSS REFERENCE TO THE RELATED APPLICATIONS

This application is based upon and claims priority to Chinese Patent Application No. 202311223079.X, filed on Sep. 20, 2023, the entire contents of which are incorporated herein by reference.

TECHNICAL FIELD

The present disclosure belongs to the technical field of fake voice detection, and in particular relates to a fake voice detection method based on dual-track differential modeling.

BACKGROUND

Deepfake is a technology that creates fake audio and video content through deep learning (DL). With gradual decline in the threshold and difficulty for the public to use Deepfake software, outlaws can engage in illegal activities such as fraud and drug trafficking through Deepfake software, which poses significant challenges to China's social trust, news authenticity, monitoring, and judicial evidence collection.

At present, fake voice detection methods mainly include robust feature extraction-based fake voice detection and effective model design-based fake voice detection. With the continuous evolution of Deepfake, various complex voice situations have emerged on the Internet, which puts forward higher requirements for the generalization and intensification of fake voice detection. In view of this, the present disclosure starts from mutual conversion between single- and dual-track stereos, providing a unique perspective on fake voice detection.

SUMMARY

In response to the aforementioned shortcomings in the prior art, the present disclosure provides a fake voice detection method based on dual-track differential modeling, which greatly improves the accuracy and robustness of fake voice detection, and has good transferability and generalization.

To achieve the above objective, the present disclosure adopts the following technical solution. The fake voice detection method based on dual-track differential modeling includes the following steps:

S1: converting, by a pre-trained single/dual-track voice conversion model, a single-track audio to a stereo; and extracting a left-track Mel spectrogram feature $Y_{1:T}^L$ and a right-track Mel spectrogram feature $Y_{1:T}^R$;

S2: acquiring an absolute value $Y_{1:T}^{L'}$ of a difference between the left-track Mel spectrogram feature $Y_{1:T}^L$ and an original single-track Mel spectrogram feature and an absolute value $Y_{1:T}^{R'}$ of a difference between the right-track Mel spectrogram feature $Y_{1:T}^R$ and the original single-track Mel spectrogram feature;

S3: performing texture enhancement on the absolute values $Y_{1:T}^{L'}$ and $Y_{1:T}^{R'}$; extracting and fusing, by two dual-branch feature extractors, texture enhancement results to acquire a final attention map $G^{tL/R}$; and S4: acquiring, by an attention pooling layer and a binary classification layer, a fake voice detection result based on the final attention map $G^{tL/R}$.

This technical solution has the following beneficial effects. The present disclosure performs fake voice detection through differential modeling on dual-track information, specifically modeling based on the differences between the Mel spectrogram feature of the stereo and the original single-track information. The design improves accuracy, robustness, transferability, and generalization performance.

The present disclosure has the following beneficial effects. The present disclosure provides a fake voice detection method based on dual-track differential modeling. The present disclosure adopts a fine-grained texture enhancement method to process the feature map, solving the problem that a fine-grained difference in a deep neural network disappears, and improving the accuracy of fake voice detection. The present disclosure utilizes a multi-head attention module to model the correlation between left and right-track information, in order to extract more detailed and useful dual-track information from a more fine-grained perspective, thereby improving the accuracy of fake voice detection. The present disclosure uses an attention pooling module for further feature fusion, and uses various data augmentation methods and different types of datasets to increase the transferability and generalization of the model, offering a stronger and more robust model.

Further, step S1 specifically includes pre-training as follows:

A1: acquiring a paired audio dataset as a training dataset, where the paired audio dataset includes a conditional time signal $C_{1:T}$ representing positions and directions of a source and a listener;

A2: reading, by a neural time warping module, the conditional time signal $C_{1:T}$, and predicting a neural warping field $\rho$; and modifying and simulating, by a time convolutional module, the predicted neural warping field $\rho$ to acquire an optimal neural warping field $\rho'$;

A3: calculating, by a recursive activation function, a left-ear curling signal $X_{1:T}^L$ and a right-ear curling signal $X_{1:T}^R$ based on the neural warping field $\rho$ and the optimal neural warping field $\rho'$;

A4: reconstructing, by a time convolutional network including a wave network, the left-track Mel spectrogram feature $Y_{1:T}^L$ and the right-track Mel spectrogram feature $Y_{1:T}^R$ based on the left-ear curling signal $X_{1:T}^L$, the right-ear curling signal $X_{1:T}^R$, and the conditional time signal $C_{1:T}$;

A5: repeating steps A1 to A4 for a total of N times to acquire parameters, left-track Mel spectrogram features $Y_{1:T}^L$, and right-track Mel spectrogram features $Y_{1:T}^R$ of N single/dual-track voice conversion models with different training times; and A6: comparing the left-track Mel spectrogram features $Y_{1:T}^L$ and the right-track Mel spectrogram features $Y_{1:T}^R$ of the N single/dual-track voice conversion models with different training times, and selecting parameters of a single/dual-track voice conversion model with an optimal effect in the Mel spectrogram feature as parameters of a final pre-trained model.

Further, in step S3, the dual-branch feature extractor includes a convolutional filter layer, a residual network layer, a graph attention network layer, and a graph pooling layer, where the convolutional filter layer and the residual network layer are configured to perform feature extraction on the absolute values $Y_{1:T}^{L'}$ and $Y_{1:T}^{R'}$ to acquire a left-track feature $h'_{1:T}^{L}$ and a right-track feature $h'_{1:T}^{R}$;

the graph attention network layer is configured to perform attention weight calculation on a spatial attention map G to acquire an aggregation result of adjacent nodes; and the graph pooling layer is configured to select a subset of nodes with a highest amount of information from the aggregation result of the adjacent nodes, form a new attention map, and acquire the final attention map $G'^{L/R}$.

The above further solution has the following beneficial effects. The present disclosure utilizes the dual-branch feature extractors to perform feature extraction on the absolute values $Y_{1:T}^{L'}$ and $Y_{1:T}^{R'}$ and perform attention weight calculation to aggregate node information, thereby acquiring the final attention map $G'^{L/R}$.

Further, step S3 specifically includes:

S31: performing texture enhancement on the absolute values $Y_{1:T}^{L'}$ and $Y_{1:T}^{R'}$; and inputting the texture enhancement results into the two dual-branch feature extractors, respectively;

S32: performing, by a convolutional filter layer and a residual network layer, feature extraction on the absolute values $Y_{1:T}^{L'}$ and $Y_{1:T}^{R'}$, respectively, to acquire a left-track feature $h'_{1:T}^{L}$ and a right-track feature $h'_{1:T}^{R}$;

S33: predicting, by a multi-head attention module, spatial attention maps based on the left-track feature $h'_{1:T}^{L}$ and the right-track feature $h'_{1:T}^{R}$ to acquire a left-track spatial attention map $h'_{1:T}^{L}$ and a right-track spatial attention map $h'_{1:T}^{R}$;

S34: performing, by an attention module, feature information fusion on the left-track spatial attention map $h'_{1:T}^{L'}$ and the right-track spatial attention map $h'_{1:T}^{R'}$ to acquire a spatial attention map G;

S35: calculating, by a graph attention network layer, an attention weight of the spatial attention map G, and aggregating adjacent nodes to acquire an aggregation result; and S36: selecting, by a graph pooling layer, a subset of nodes with a highest amount of information from the aggregation result, forming a new attention map, and acquiring the final attention map $G'^{L/R}$.

The above further solution has the following beneficial effects. The present disclosure processes left and right-track feature information by the dual-branch architecture and fuse attention features of the dual-track information for final decision-making. Through the dual-track stereo information processing, a fake audio is more easily exposed and successfully detected by the model, improving the accuracy and generalization of the model.

Further, in step S31, the texture enhancement specifically includes:

B1: downsampling, by a local average pooling layer, feature maps of the absolute values $Y_{1:T}^{L'}$ and $Y_{1:T}^{R'}$ to acquire a pooled feature map;

B2: performing, by a residual module, residual processing on the pooled feature map to acquire track texture information; and B3: enhancing, by a convolutional block, the track texture information to acquire the left-track Mel spectrogram feature and the right-track Mel spectrogram feature after the texture enhancement.

The above further solution has the following beneficial effects. The present disclosure utilizes a fine-grained texture enhancement method to average global information, solving the problem that a fine-grained difference in a deep neural network disappears, achieving efficient fine-grained classification, and improving the accuracy of fake voice detection.

Further, in step B2, the residual processing is expressed as follows:

$$T_{L/R} = f(a_{L/R}) - D_{L/R}$$

where, $T_{L/R}$ denotes the track texture information generated through the residual processing; L and R respectively denote absolute values of a left-track Mel spectrogram feature difference and a right-track Mel spectrogram feature difference of the stereo; $f(a_{L/R})$ denotes a feature map of the absolute values of the left-track Mel spectrogram feature difference and the right-track Mel spectrogram feature difference; and $D_{L/R}$ denotes the pooled feature map.

The above further solution has the following beneficial effects. The present disclosure utilizes a residual module to perform residual processing on the pooled feature map and acquire the track texture information, facilitating track information texture enhancement.

Further, in step S33, the spatial attention maps $h'_{1:T}^{L'}$ and $h'_{1:T}^{R'}$ are expressed as follows:

$$h'_{1:T}^{L} = f^{L}(Y_{1:T}^{L'}),$$

$$h'_{1:T}^{R} = f^{R}(Y_{1:T}^{R'})$$

where, $Y_{1:T}^{L'}$ denotes the absolute value of the difference between the left-track Mel spectrogram feature and the original single-track Mel spectrogram feature; $Y_{1:T}^{R'}$ denotes the absolute value of the difference between the right-track Mel spectrogram feature and the original single-track Mel spectrogram feature; $f^{L}(.)$ and $f^{R}(.)$ respectively denote an extraction process function of the left-track Mel spectrogram feature and an extraction process function of the right-track Mel spectrogram feature; and $h'_{1:T}^{L}$ and $h'_{1:T}^{R}$ respectively denote the extracted left-track feature and the extracted right-track feature.

The above further solution has the following beneficial effects. The present disclosure performs feature extraction on the left-track information and the right-track information, and predicts the spatial attention maps, facilitating subsequent analysis and modeling.

Further, in step S34, the spatial attention map G is expressed as follows:

$$G = G(N, \varepsilon, h')$$

where, N denotes a number of nodes in the spatial attention map; ε denotes connecting edges between all nodes, including a self-connection; and h' denotes feature representation.

The above further solution has the following beneficial effects. The present disclosure fuses the spatial attention maps of the left and right-tracks.

Further, in step S35, the attention weight is expressed as follows:

$$\alpha_{u,n} = \frac{\exp(W_{(h'_n \odot h'_u)})}{\sum_{w \in M(n) \cup \{n\}} \exp(W(h'_n \odot h'_w))}$$

where, u and n denote nodes; $\alpha_{u,n}$ denotes an attention weight after the node u and the node n are aggregated; exp(.) denotes an exponential function; M(n) denotes an adjacent node of the node n; W denotes a learnable weight; $h'_n$ denotes a feature vector of the node n; $h'_u$ denotes a feature vector of the node u; ⊙ denotes multiplication at an element level; and $h'_w$ denotes a feature vector of a node w.

The above further solution has the following beneficial effects. The present disclosure aggregates the adjacent nodes with a learnable weight through a self-attention mechanism and acquires more detailed and useful information, improving the accuracy of fake voice detection.

Further, in step S36, information of the n nodes in the final attention map $G'^{L/R}$ is expressed as follows:

$$o_n = ReLU(BN(m_n + h'_n))$$

$$m_m = \sum_{u \in M(n) \cup \{n\}} \alpha_{u,n} h'_u$$

where, on denotes the information of the n nodes in the final attention map $G'^{L/R}$; $m_n$ denotes information after the n nodes are aggregated; ReLU denotes an activation function; BN denotes batch normalization; $m_i$ denotes aggregation information of an i-th node; h'n denotes a feature vector of the node n; M(n) denotes a set of adjacent nodes of the node n; $\alpha_{u,n}$ denotes an attention weight between the nodes u and n; and $h'_u$ denotes a feature vector of the node u.

The above further solution has the following beneficial effects. The present disclosure utilizes the ReLU function and BN function to perform batch normalization on and activate the information of the n aggregated nodes to acquire information of the n nodes in the final attention map $G'_{L/R}$, facilitating the generation of the final attention map $G'_{L/R}$.

BRIEF DESCRIPTION OF THE DRAWINGS

FIGURE is a flowchart of a fake voice detection method based on dual-track differential modeling according to the present disclosure.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

The present disclosure provides a fake voice detection method based on dual-track differential modeling. As shown in FIGURE, the fake voice detection method includes the following steps.

S1. A pre-trained single/dual-track voice conversion model converts a single-track audio to a stereo, and extracts left-track Mel spectrogram feature $Y_{1:T}^L$ and right-track Mel spectrogram feature $Y_{1:T}^R$.

S2. Absolute value $Y_{1:T}^{L'}$ of a difference between the left-track Mel spectrogram feature $Y_{1:T}^L$ and an original single-track Mel spectrogram feature and absolute value $Y_{1:T}^{R'}$ of a difference between the right-track Mel spectrogram feature $Y_{1:T}^R$ and the original single-track Mel spectrogram feature are acquired.

S3. Texture enhancement is performed on the absolute values $Y_{1:T}^{L'}$ and $Y_{1:T}^{R'}$, and two dual-branch feature extractors extract and fuse texture enhancement results respectively to acquire final attention map $G'^{L/R}$.

S4. An attention pooling layer and a binary classification layer acquire a fake voice detection result based on the final attention map $G'^{L/R}$.

The present disclosure pre-trains the single/dual-track voice conversion model through large-scale voice data, and uses the texture enhancement module to solve the problem that a fine-grained difference disappears in a deep neural network. The present disclosure performs fake voice detection through differential modeling on dual-track information, specifically modeling based on the differences between the Mel spectrogram feature of the stereo and the original single-track information. In this way, the present disclosure constructs a more accurate and more generalized fake voice detection model.

Step S1 specifically includes pre-training as follows.

A1. A paired audio dataset is acquired as a training dataset, where the paired audio dataset includes conditional time signal $C_{1:T}$ representing positions and directions of a source and a listener.

A2. A neural time warping module reads the conditional time signal $C_{1:T}$, and predicts neural warping field ρ. A time convolutional module modifies and simulates the predicted neural warping field ρ to acquire optimal neural warping field ρ'.

A3. A recursive activation function calculates left-ear curling signal $X_{1:T}^L$ and right-ear curling signal $X_{1:T}^R$ based on the neural warping field ρ and the optimal neural warping field ρ'.

A4. A time convolutional network including a wave network reconstructs the left-track Mel spectrogram feature $Y_{1:T}^L$ and the right-track Mel spectrogram feature $Y_{1:T}^R$ based on the left-ear curling signal $X_{1:T}^L$, the right-ear curling signal $X_{1:T}^R$, and the conditional time signal $C_{1:T}$;

A5. Steps A1 to A4 are repeated for a total of N times to acquire parameters, left-track Mel spectrogram features $Y_{1:T}^L$, and right-track Mel spectrogram features $Y_{1:T}^R$ of N single/dual-track voice conversion models with different training times.

A6. The left-track Mel spectrogram features $Y_{1:T}^L$ and the right-track Mel spectrogram features $Y_{1:T}^R$ of the N single/dual-track voice conversion models with different training times are compared, and parameters of a single/dual-track voice conversion model with an optimal effect in the Mel spectrogram feature is selected as parameters of a final pre-trained model.

Before pre-training the single/dual-track voice conversion model, a fixed length of <single-track, stereo> paired audio data is required. Large scale voice data comes from totally 20 h of 48 kHz paired single-track and stereo data of fourteen speakers (seven males and seven females). Specifically, a mannequin wearing microphones on two ears serves as a listener, and the participants walk around the mannequin in a circle with a radius of 1.5 m and engage in scriptless conversations with the mannequin. The conditional time signal $C_{1:T}$ of each audio is derived from real scenes.

In step S3, the dual-branch feature extractor includes a convolutional filter layer, a residual network layer, a graph attention network layer, and a graph pooling layer, and introduce a multi-head attention module and an attention module.

The convolutional filter layer and the residual network layer are configured to perform feature extraction on the absolute values $Y_{1:T}^{L'}$ and $Y_{1:T}^{R'}$ of the differences between the left/right-track Mel spectrogram features and the original single-track Mel spectrogram feature to acquire left-track feature $h'_{1:T}^L$ and right-track feature $h'_{1:T}^R$.

The multi-head attention module is configured to predict left and right spatial attention maps $h'_{1:T}{}^{L'}$ and $h'_{1:T}{}^{R'}$ based on $h'_{1:T}{}^{L}$ and $h'_{1:T}{}^{R}$.

The attention module is configured to fuse the left and right spatial attention maps $h'_{1:T}{}^{L'}$ and $h'_{1:T}{}^{R'}$ to acquire a spatial attention map G.

The graph attention network layer is configured to perform attention weight calculation on the spatial attention map G to acquire an aggregation result of adjacent nodes.

The graph pool optimize layer is configured to select a subset of nodes with a highest amount of information from the aggregation result of the adjacent nodes, form a new attention map, and acquire the final attention map $G'^{L/R}$.

In the embodiment of the present disclosure, in step S3, the feature extraction and processing on the dual-track Mel spectrogram feature is specifically as follows.

S31. Texture enhancement is performed on the absolute values $Y_{1:T}{}^{L'}$ and $Y_{1:T}{}^{R'}$; and the texture enhancement results are input into the two dual-branch feature extractors, respectively.

S32. A convolutional filter layer and a residual network layer perform feature extraction on the absolute values $Y_{1:T}{}^{L'}$ and $Y_{1:T}{}^{R'}$, respectively, to acquire a left-track feature $h'_{1:T}{}^{L}$ and a right-track feature $h'_{1:T}{}^{R}$.

S33. A multi-head attention module predicts spatial attention maps based on the left-track feature $h'_{1:T}{}^{L}$ and the right-track feature $h'_{1:T}{}^{R}$ to acquire left-track spatial attention map $h'_{1:T}{}^{L'}$ and right-track spatial attention map $h'_{1:T}{}^{R'}$.

S34. An attention module performs feature information fusion on the left-track spatial attention map $h'_{1:T}{}^{L'}$ and the right-track spatial attention map $h'_{1:T}{}^{R'}$ to acquire spatial attention map G.

S35. A graph attention network layer calculates an attention weight of the spatial attention map G, and aggregating adjacent nodes to acquire an aggregation result.

S36. A graph pooling layer selects a subset of nodes with a highest amount of information from the aggregation result, forms a new attention map, and acquires the final attention map $G'^{L/R}$.

In step S31, the texture enhancement is specifically as follows.

B1. A local average pooling layer downsamples feature maps of the absolute values $Y_{1:T}{}^{L'}$ and $Y_{1:T}{}^{R'}$ to acquire a pooled feature map.

B2. A residual module performs residual processing on the pooled feature map to acquire track texture information.

B3. A convolutional block enhances the track texture information to acquire the left-track Mel spectrogram feature and the right-track Mel spectrogram feature after the texture enhancement.

In step B2, the residual processing is expressed as follows:

$$T_{L/R} = f(a_{L/R}) - D_{L/R}$$

where, $T_{L/R}$ denotes the track texture information generated through the residual processing; L and R respectively denote absolute values of a left-track Mel spectrogram feature difference and a right-track Mel spectrogram feature difference of the stereo; $f(a_{L/R})$ denotes a feature map of the absolute values of the left-track Mel spectrogram feature difference and the right-track Mel spectrogram feature difference; and $D_{L/R}$ denotes the pooled feature map.

In step S33, the spatial attention maps $h'_{1:T}{}^{L'}$ and $h'_{1:T}{}^{R'}$ are expressed as follows:

$$h'_{1:T}{}^{L} = f^L(Y_{1:T}{}^{L'})$$

$$h'_{1:T}{}^{R} = f^R(Y_{1:T}{}^{R'})$$

where, $Y_{1:T}{}^{L'}$ denotes the absolute value of the difference between the left-track Mel spectrogram feature and the original single-track Mel spectrogram feature; $Y_{1:T}{}^{R'}$ denotes the absolute value of the difference between the right-track Mel spectrogram feature and the original single-track Mel spectrogram feature; $f^L(.)$ and $f^R(.)$ respectively denote an extraction process function of the left-track Mel spectrogram feature and an extraction process function of the right-track Mel spectrogram feature; and $h'_{1:T}{}^{L}$ and $h'_{1:T}{}^{R}$ respectively denote the extracted left-track feature and the extracted right-track feature.

In step S34, the spatial attention map G is expressed as follows:

$$G = G(N, \varepsilon, h')$$

where, N denotes a number of nodes in the spatial attention map; $\varepsilon$ denotes connecting edges between all nodes, including a self-connection; and h' denotes feature representation.

In step S35, the attention weight is expressed as follows:

$$\alpha_{u,n} = \frac{\exp(W_{(h'_n \odot h'_u)})}{\sum_{w \in M(n) \cup \{n\}} \exp(W(h'_n \odot h'_w))}$$

where, u and n denote nodes; $\alpha_{u,n}$ denotes an attention weight after the node u and the node n are aggregated; exp(.) denotes an exponential function; M(n) denotes an adjacent node of the node n; W denotes a learnable weight; $h'_n$ denotes a feature vector of the node n; $h'_u$ denotes a feature vector of the node u; $\odot$ denotes multiplication at an element level; and $h'_w$ denotes a feature vector of node w.

In step S36, information of the n nodes in the final attention map $G'^{L/R}$ is expressed as follows:

$$o_n = ReLU(BN(m_n + h'_n))$$

$$m_m = \sum_{u \in M(n) \cup \{n\}} \alpha_{u,n} h'_u$$

where, $o_n$ denotes the information of the n nodes in the final attention map $G'^{L/R}$; $m_n$ denotes information after the n nodes are aggregated; ReLU denotes an activation function; BN denotes batch normalization; $m_i$ denotes aggregation information of an i-th node; $h'_n$ denotes a feature vector of the node n; M(n) denotes a set of adjacent nodes of the node n; $\alpha_{u,n}$ denotes an attention weight between the nodes u and n; and $h'_u$ denotes a feature vector of the node u.

The working principle and process of the present disclosure are as follows. Firstly, the single/dual-track voice conversion model is pre-trained through large-scale voice data, and the problem that a fine-grained difference disappears in a deep neural network is solved through the texture enhancement module. The trained single/dual-track voice conversion model converts the single-track audio into the stereo and extracts the dual-track Mel spectrogram features.

The absolute values of the differences between the dual-track Mel spectrogram feature and the original single-track Mel spectrogram feature are input into the fake voice detection model. Specifically, the absolute values are input into the two dual-branch feature extractors to extract and process the feature information, thereby acquiring the final information $G'^{L/R}$. The final information is input into the attention pooling layer and the binary classification layer to acquire the fake voice detection result.

The present disclosure has the following beneficial effects. The present disclosure provides a fake voice detection method based on dual-track differential modeling, providing a new perspective for research in the field of fake voice detection and improving the accuracy of fake voice detection. The present disclosure adopts a fine-grained texture enhancement method to solve the problem that a fine-grained difference in a deep neural network disappears, and improving the accuracy of fake voice detection. The present disclosure utilizes a multi-head attention mechanism to model the correlation between left and right-track information, in order to extract more detailed and useful dual-track information from a more fine-grained perspective, thereby improving the accuracy of fake voice detection. The present disclosure uses a final attention module and attention pooling module for further feature fusion, and uses various data augmentation methods and different types of datasets to increase the transferability and generalization of the model, offering a stronger and more robust model.

What is claimed is:

1. A fake voice detection method based on dual-track differential modeling, comprising the following steps:

S1: converting, by a pre-trained single/dual-track voice conversion model, a single-track audio to a stereo; and extracting a left-track Mel spectrogram feature $Y_{1:T}^{L}$ and a right-track Mel spectrogram feature $Y_{1:T}^{R}$;

S2: acquiring an absolute value $Y_{1:T}^{L'}$ of a difference between the left-track Mel spectrogram feature $Y_{1:T}^{L}$ and an original single-track Mel spectrogram feature and an absolute value $Y_{1:T}^{R'}$ of a difference between the right-track Mel spectrogram feature $Y_{1:T}^{R}$ and the original single-track Mel spectrogram feature;

S3: performing texture enhancement on the absolute values $Y_{1:T}^{L'}$ and $Y_{1:T}^{R'}$; extracting and fusing, by two dual-branch feature extractors, texture enhancement results to acquire a final attention map $G'^{L/R}$, and S4: acquiring, by an attention pooling layer and a binary classification layer, a fake voice detection result based on the final attention map $G'^{L/R}$.

2. The fake voice detection method based on dual-track differential modeling according to claim 1, wherein step S1 comprises pre-training as follows:

A1: acquiring a paired audio dataset as a training dataset, wherein the paired audio dataset comprises a conditional time signal $C_{1:T}$ representing positions and directions of a source and a listener;

A2: reading, by a neural time warping module, the conditional time signal $C_{1:T}$, and predicting a neural warping field ρ; and modifying and simulating, by a time convolutional module, the predicted neural warping field p to acquire an optimal neural warping field ρ';

A3: calculating, by a recursive activation function, a left-ear curling signal $X_{1:T}^{L}$ and a right-ear curling signal $X_{1:T}^{R}$ based on the neural warping field p and the optimal neural warping field ρ';

A4: reconstructing, by a time convolutional network comprising a wave network, the left-track Mel spectrogram feature $Y_{1:T}^{L}$ and the right-track Mel spectrogram feature $Y_{1:T}^{R}$ based on the left-ear curling signal $X_{1:T}^{L}$, the right-ear curling signal $X_{1:T}^{R}$, and the conditional time signal $C_{1:T}$;

A5: repeating steps A1 to A4 for a total of N times to acquire parameters, left-track Mel spectrogram features $Y_{1:T}^{L}$, and right-track Mel spectrogram features $Y_{1:T}^{R}$ of N single/dual-track voice conversion models with different training times; and A6: comparing the left-track Mel spectrogram features $Y_{1:T}^{L}$ and the right-track Mel spectrogram features $Y_{1:T}^{R}$ of the N single/dual-track voice conversion models with different training times, and selecting parameters of a single/dual-track voice conversion model with an optimal effect as parameters of a final pre-trained model.

3. The fake voice detection method based on dual-track differential modeling according to claim 1, wherein in step S3, each of the two dual-branch feature extractors comprises a convolutional filter layer, a residual network layer, a graph attention network layer, and a graph pooling layer, wherein the convolutional filter layer and the residual network layer are configured to perform feature extraction on the absolute values $Y_{1:T}^{L'}$ and $Y_{1:T}^{R'}$ to acquire a left-track feature $h'_{1:T}^{L}$ and a right-track feature $h'_{1:T}^{R}$, the graph attention network layer is configured to perform attention weight calculation on a spatial attention map G to acquire an aggregation result of adjacent nodes; and the graph pooling layer is configured to select a subset of nodes with a highest amount of information from the aggregation result of the adjacent nodes, form a new attention map, and acquire the final attention map $G'^{L/R}$.

4. The fake voice detection method based on dual-track differential modeling according to claim 1, wherein step S3 comprises:

S31: performing texture enhancement on the absolute values $Y_{1:T}^{L'}$ and $Y_{1:T}^{R'}$; and inputting the texture enhancement results into the two dual-branch feature extractors, respectively;

S32: performing, by a convolutional filter layer and a residual network layer, feature extraction on the absolute values $Y_{1:T}^{L'}$ and $Y_{1:T}^{R'}$, respectively, to acquire a left-track feature $h'_{1:T}^{L}$ and a right-track feature $h'_{1:T}^{R}$;

S33: predicting, by a multi-head attention module, spatial attention maps based on the left-track feature $h'_{1:T}^{L}$ and the right-track feature $h'_{1:T}^{R}$ to acquire a left-track spatial attention map $h'_{1:T}^{L'}$ and a right-track spatial attention map $h'_{1:T}^{R'}$;

S34: performing, by an attention module, feature information fusion on the left-track spatial attention map $h'_{1:T}^{L'}$ and the right-track spatial attention map $h'_{1:T}^{R'}$ to acquire a spatial attention map G;

S35: calculating, by a graph attention network layer, an attention weight of the spatial attention map G, and aggregating adjacent nodes to acquire an aggregation result; and S36: selecting, by a graph pooling layer, a subset of nodes with a highest amount of information from the aggregation result, forming a new attention map, and acquiring the final attention map $G'^{L/R}$.

5. The fake voice detection method based on dual-track differential modeling according to claim 4, wherein in step S31, the texture enhancement comprises:

B1: downsampling, by a local average pooling layer, feature maps of the absolute values $Y_{1:T}^{L'}$ and $Y_{1:T}^{R'}$ to acquire a pooled feature map;

B2: performing, by a residual module, residual processing on the pooled feature map to acquire track texture information; and B3: enhancing, by a convolutional block, the track texture information to acquire the left-track Mel spectrogram feature and the right-track Mel spectrogram feature after the texture enhancement.

6. The fake voice detection method based on dual-track differential modeling according to claim 5, wherein in step B2, the residual processing is expressed as follows:

$$T_{L/R} = f(a_{L/R}) - D_{L/R}$$

wherein $T_{L/R}$ denotes the track texture information generated through the residual processing; L and R respectively denote absolute values of a left-track Mel spectrogram feature difference and a right-track Mel spectrogram feature difference of the stereo; $f(a_{L/R})$ denotes a feature map of the absolute values of the left-track Mel spectrogram feature difference and the right-track Mel spectrogram feature difference; and $D_{L/R}$ denotes the pooled feature map.

7. The fake voice detection method based on dual-track differential modeling according to claim 4, wherein in step S32, the feature extraction on the absolute values $Y_{1:T}^{L'}$ and $Y_{1:T}^{R'}$ by the convolutional filter layer and the residual network layer is as follows:

$$h'_{1:T}{}^{L} = f^{L}(Y_{1:T}^{L'}),$$

$$h'_{1:T}{}^{R} = f^{R}(Y_{1:T}^{R'})$$

wherein $Y_{1:T}^{L'}$ denotes the absolute value of the difference between the left-track Mel spectrogram feature and the original single-track Mel spectrogram feature; $Y_{1:T}^{R'}$ denotes the absolute value of the difference between the right-track Mel spectrogram feature and the original single-track Mel spectrogram feature; $f^{L}(.)$ and $f^{R}(.)$ respectively denote an extraction process function of the left-track Mel spectrogram feature and an extraction process function of the right-track Mel spectrogram feature; and $h'_{1:T}{}^{L}$ and $h'_{1:T}{}^{R}$ respectively denote the left-track feature and the right-track feature.

8. The fake voice detection method based on dual-track differential modeling according to claim 4, wherein in step S34, the spatial attention map G is expressed as follows:

$$G = G(N, \varepsilon, h)$$

wherein N denotes a number of nodes in the spatial attention map; $\varepsilon$ denotes connecting edges between all nodes, comprising a self-connection; and h' denotes feature representation.

9. The fake voice detection method based on dual-track differential modeling according to claim 4, wherein in step S35, the attention weight is expressed as follows:

$$\alpha_{u,n} = \frac{\exp(W_{(h'_n \odot h'_u)})}{\sum_{w \in M(n) \cup \{n\}} \exp(W(h'_n \odot h'_w))}$$

wherein u and n denote nodes; $\alpha_{u,n}$ denotes an attention weight after the node u and the node n are aggregated; exp(.) denotes an exponential function; M(n) denotes an adjacent node of the node n; W denotes a learnable weight; $h'_n$ denotes a feature vector of the node n; $h'_u$ denotes a feature vector of the node u; $\odot$ denotes multiplication at an element level; and $h'_w$ denotes a feature vector of a node w.

10. The fake voice detection method based on dual-track differential modeling according to claim 4, wherein in step S36, information of the n nodes in the final attention map $G'^{L/R}$ is expressed as follows:

$$o_n = ReLU(BN(m_n + h'_n))$$

$$m_m = \sum_{u \in M(n) \cup \{n\}} \alpha_{u,n} h'_u$$

wherein $o_n$ denotes the information of the n nodes in the final attention map $G'^{L/R}$; $m_n$ denotes information after the n nodes are aggregated; ReLU denotes an activation function; BN denotes batch normalization; $m_i$ denotes aggregation information of an i-th node; $h'_n$ denotes a feature vector of a node n; M(n) denotes a set of adjacent nodes of the node n; $\alpha_{u,n}$ denotes an attention weight between a node u and the node n; and $h'_u$ denotes a feature vector of the node u.

11. The fake voice detection method based on dual-track differential modeling according to claim 4, wherein in step in step S33, the left-track spatial attention map $h'_{1:T}{}^{L'}$ and the right-track spatial attention map $h'_{1:T}{}^{R'}$ are expressed as follows:

$$h'_{1:T}{}^{L'/R'} = \text{MultiHeadAttention}(h'_{1:T}{}^{L/R})$$

wherein $h'_{1:T}{}^{L}$ and $h'_{1:T}{}^{R}$ respectively denote the left-track feature and the right-track feature, and MultiHeadAttention denotes multi-head attention module.

* * * * *